Nov. 16, 1971   C. W. CLARK   3,620,145
FILM SUPPORT WITH INTERCHANGEABLE CAMERA MEANS
Filed Nov. 19, 1968   5 Sheets-Sheet 1

INVENTOR
Charles William Clark
BY
Watson, Cole, Grindle, Watson
ATTORNEYS

Nov. 16, 1971  C. W. CLARK  3,620,145
FILM SUPPORT WITH INTERCHANGEABLE CAMERA MEANS
Filed Nov. 19, 1968

INVENTOR
Charles William Clark
BY
Watson Cole Grindle Watson
ATTORNEYS

3,620,145
FILM SUPPORT WITH INTERCHANGEABLE CAMERA MEANS

Charles W. Clark, Kings Grove,
Maidenhead, Berkshire, England
Filed Nov. 19, 1968, Ser. No. 776,871
Claims priority, application Great Britain, Nov. 20, 1967,
52,748/67
Int. Cl. G03b *17/53*
U.S. Cl. 95—11                 8 Claims

ABSTRACT OF THE DISCLOSURE

Photographic apparatus including a single support arranged to locate and support a sheet of photo-sensitive material in a light-tight manner in an exposure position and two cameras adjacent to one another. A guide is provided for moving the cameras and the support relative to one another between positions in which the support is behind one or other of the cameras. The guide is constructed so that the initial and terminal relative movements between the cameras and the support means are generally parallel with the axes of the cameras.

---

Figure 1:
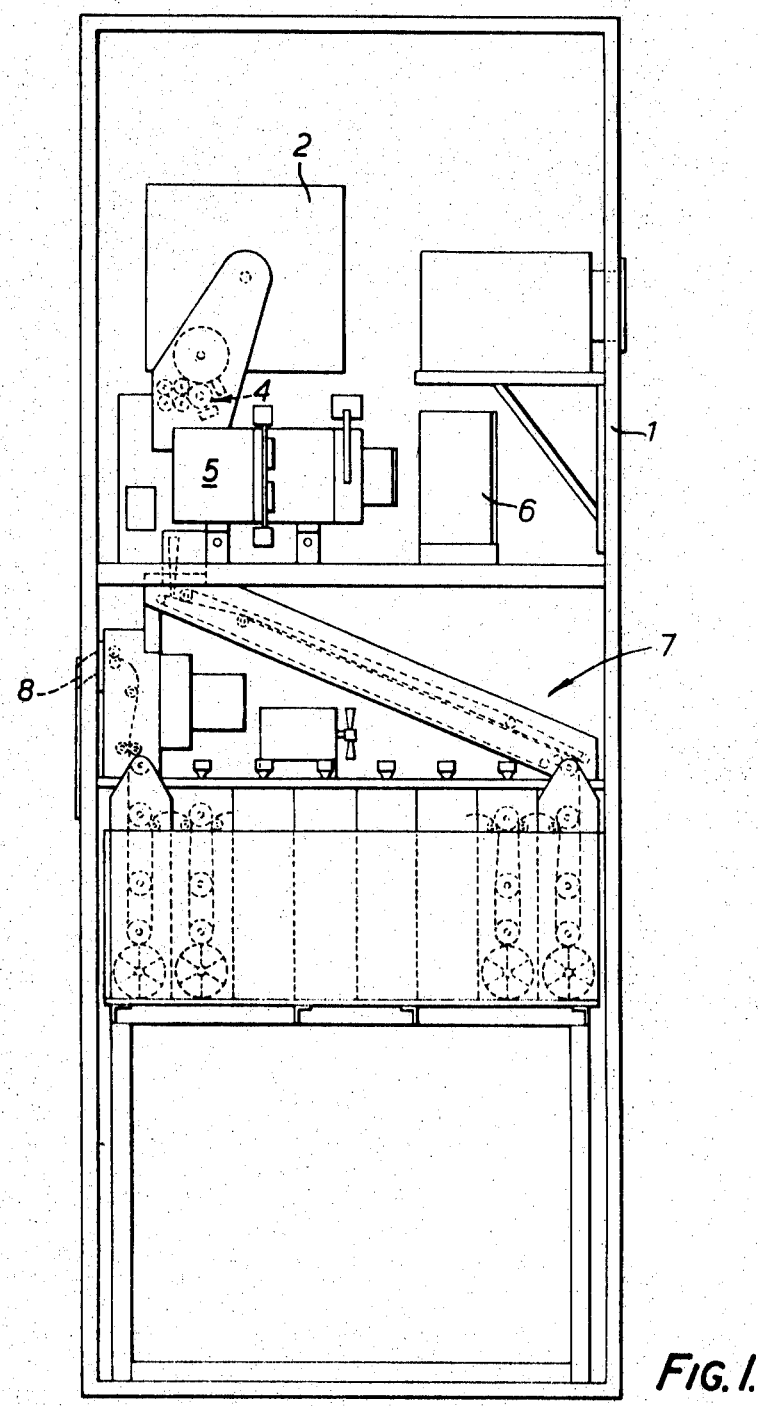

This invention relates to photographic apparatus.

Photographic apparatus according to the invention includes support means arranged to locate and support a sheet of photo-sensitive material in an exposure position, two cameras adjacent to one another and guide means for moving the cameras and support means relative to one another between positions in which the support means is behind one or the other of the cameras, the guide means being constructed so that the initial and terminal relative movements between the cameras and the support means are generally parallel with the axes of the cameras.

The apparatus is particularly suitable for use in automatic photographic apparatus of the kind which is arranged to be brought into operation by actuation of initiating mechanism and upon such actuation, as by the insertion of a coin in a slot, applies to a piece of photo-sensitive sheet material disposed in an exposure position, one or more latent images of a subject occupying an appropriate position, as by being seated on a suitable stool in a sitter's compartment, the photo-sensitive sheet material then being passed through treatment apparatus to develop and fix the image and finally being delivered as a finished photograph. An example of such photographic apparatus is shown in the present applicant's British patent specification No. 1,053,854.

One form of photographic apparatus of the kind referred to which is well known incorporates two cameras which are mounted side by side, one of which has a single objective for taking one large photograph and the other of which has a number of objectives for taking several small photographs. The cameras are mounted on lead screws for exchanging the cameras in the exposure position. Thus the cameras are moved laterally relative to the exposure position and it is therefore difficult to ensure light tightness. Moreover, there is a risk of scratching as the camera moves sideways.

With photographic apparatus according to the present invention although a relative movement perpendicular to the axes of the cameras is necessary to change the support from behind one camera to behind the other, the final stages of the movement are generally parallel with these axes so that the camera and support are moving towards each other rather than sliding past each other so that it is possible to move them into close contact and to achieve a high degree of light exclusion.

In photographic apparatus according to the invention in the majority of cases, the support will remain stationary and the cameras will move. The guide means may take various forms but preferably the cameras are coupled, either directly or indirectly as through the framework of the apparatus, to the support by a linkage producing the required movement. The simplest linkage is afforded by parallel links so that movement is arcuate.

Preferably one camera is arranged to produce a single large image of a subject occupying substantially the whole area of a sheet of sensitised material and the other camera is arranged to produce four small images each occupying approximately one quarter of the area of a sheet of sensitised material.

In a preferred arrangement there is, on the side of the support remote from the cameras, a border producing system for borders on the finished photograph and having two sections, one for producting a border around the single image produced by the one camera and the other for producing borders around the several images produced by the other camera and there is second guide means for moving the said system and support means relative to one another between positions in which the support means is in front of one section or the other of the said system, the second guide means being constructed so that the initial and terminal relative movements between the said system and the support means are generally parallel with the axes of the cameras. The first and second guide means may be afforded by the same parallel links centrally pivoted on or adjacent the support with the cameras pivoted to one end of the links and the said system pivoted to the other. Thus the cameras and the system can be moved from one position to the other simultaneously.

In a preferred construction the border producing system includes an opaque mask or masks arranged to closely abut the area or areas of sheet to be exposed and means for exposing the remaining area of the sheet to light for an appropriate period so that the sheet, when delivered from the treatment apparatus, will have a white border around the image or images.

Figure 2:
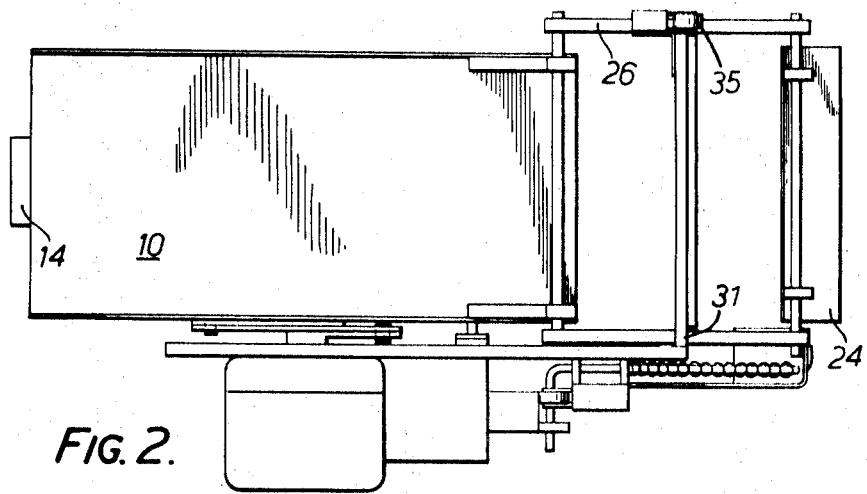
Figure 3:
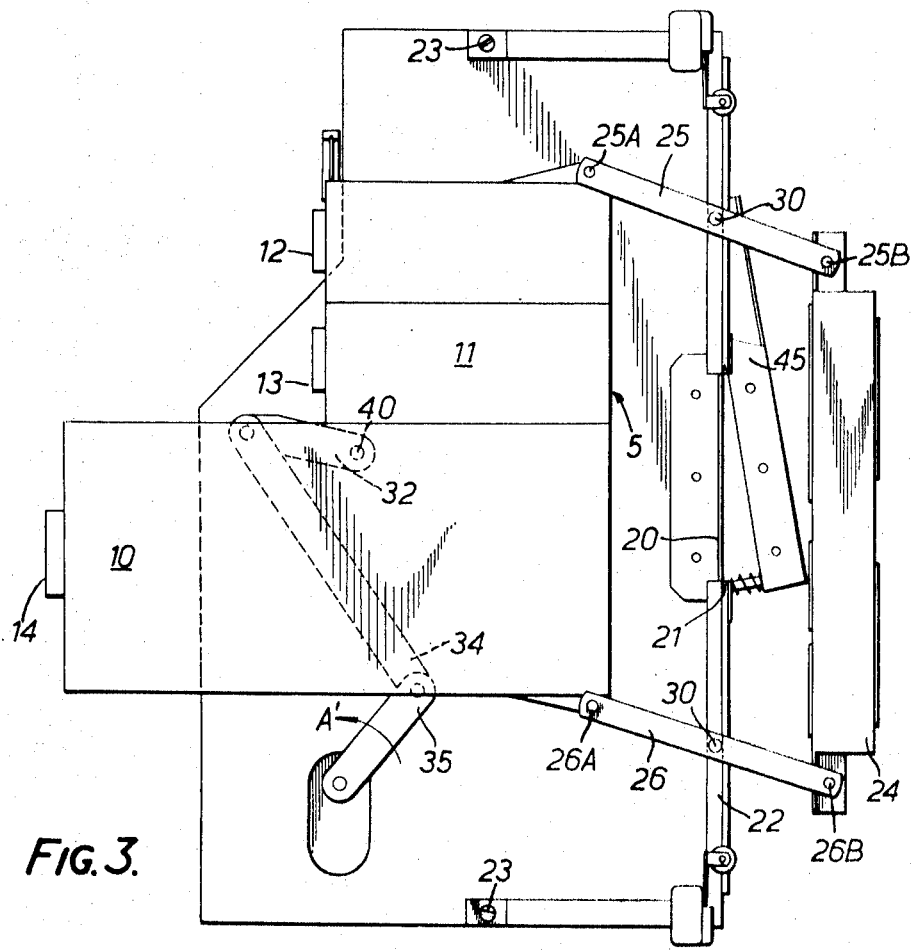
Figure 4:
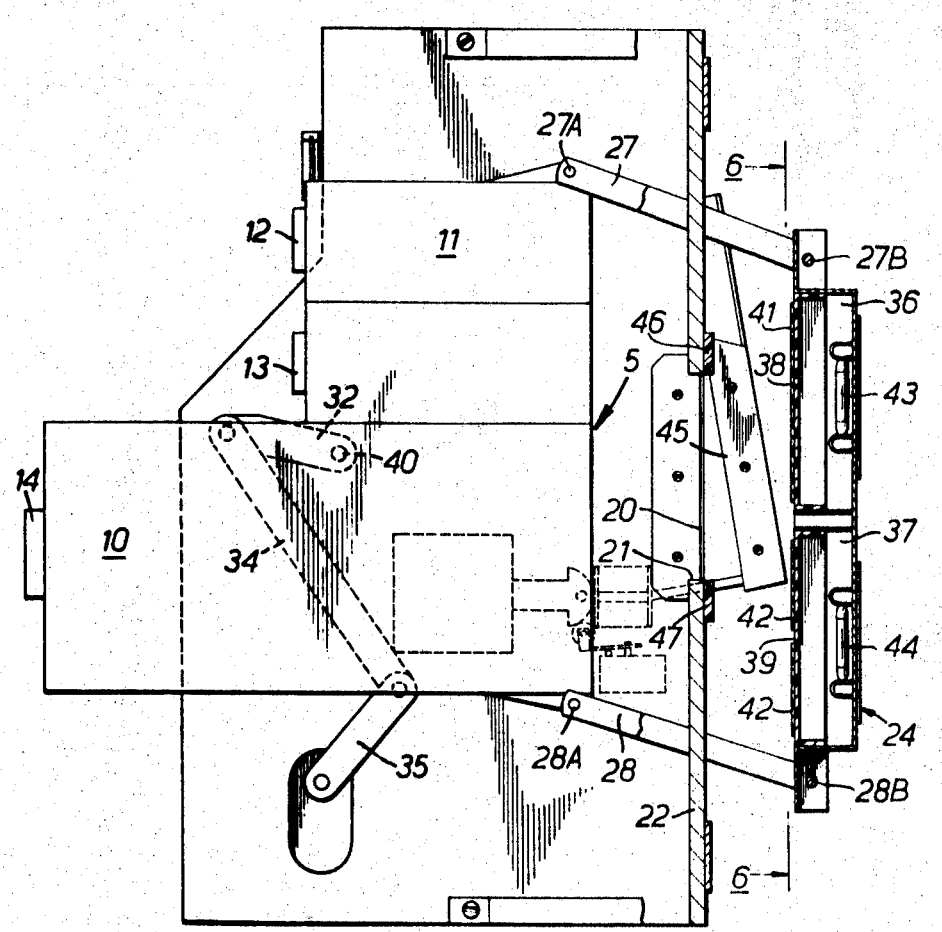
Figure 5:
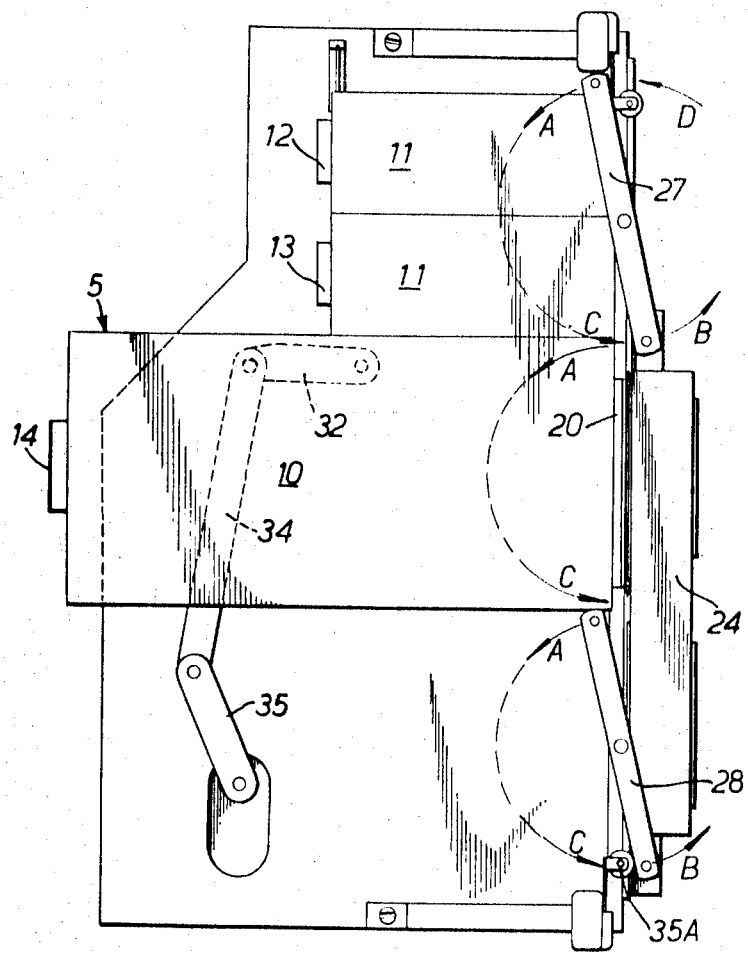
Figure 6:
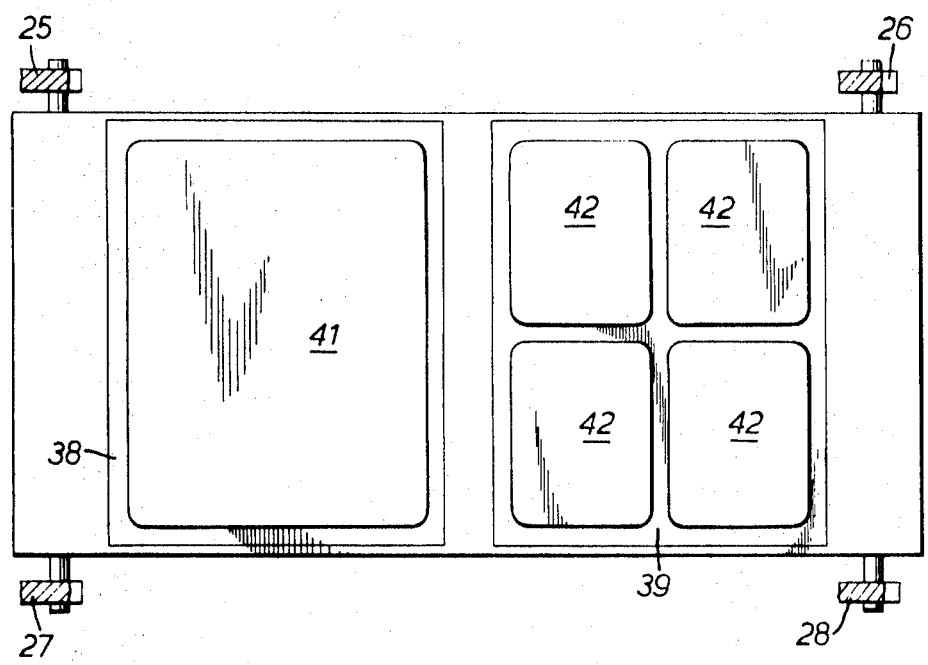

The invention may be carried into practice in various ways and one specific embodiment will now be described by way of example with reference to the accompanying drawings, in which:

FIG. 1 is a general view of an automatic photographic studio incorporating photographic apparatus according to the present invention, FIG. 2 is a side elevation of photographic apparatus according to the invention, FIG. 3 is a plan view of the camera assembly of FIG. 2 shown in an intermediate position, FIG. 4 is a further plan view of the camera assembly of FIG. 2, partly in cross-section, FIG. 5 is a similar view to FIG. 3 showing the cameras in position to take one large exposure, and FIG. 6 is a cross-section on the line 6—6 of FIG. 4.

As shown in FIG. 1 the photographic apparatus is housed in a cubicle indicated generally at 1. The upper part of the cubicle 1 contains a film storage magazine 2, a feed-down mechanism indicated generally at 4 for feeding a sensitised sheet of paper from the magazine into an exposure position, a camera assembly indicated generally at 5 as hereinafter more fully described, a mirror 6 inclined at 45° to the plane of the paper so as to reflect the light from a subject into the camera which is arranged at 90° to the subject, and processing and treatment apparatus indicated generally at 7 in the lower part of the cubicle through which the exposed sheet of sensitised material passes after being released from the camera assembly to develop and fix the image on the sheet and to deliver it to a slot 8 for receipt by the subject. Apparatus of this general kind is shown for example in the present applicant's British specification No. 1,053,854.

As shown more clearly in FIGS. 2 to 5 the camera assembly comprises two cameras 10 and 11 arranged side by side, camera 11 having four objectives, only two of which are shown at 12 and 13, arranged to produce four small images on a sheet of sensitised material, each image occupying approximately a quarter of the area of the sheet, while camera 10 has one objective 14 arranged to produce one large image occupying approximately the whole of the area of the sheet.

The sheet of sensitised material upon which the image is to be exposed is indicated at 20 and is held in an exposure position in a slot 21 in a plate 22 rigidly secured to the frame of the photographic apparatus, by screws 23. Disposed to the rear of the plate 22 is a border producing system 24 as hereinafter more fully described.

The camera assembly and the border producing system are connected together by two arms 27, 28 on their lower sides, the arms 25, 26 and 27, 28 being pivotally connected at their centres to pivot pins 30, 31 extending respectively from the upper and lower edges of the plate 22. The arms 25, 26, 27 and 28 are pivotally connected at their ends to the camera assembly respectively at 25A, 26A, 27A and 28A and to the border producing system at 25B, 26B, 27B and 28B.

Pivotally connected at 40 to the underside of the camera 10 is one of an arm 32 the other end of which is pivotally connected to one end of a second arm 34, the other end of which is pivotally connected to a crank 35. The length of the arms 32, 34 and crank 35 are chosen so that the cameras can be moved from one position to the other by unidirectional rotation of the crank arm as hereinafter more fully described.

The border producing system 24 comprises two connected rectangular closed box-shaped structures 36 and 37 each having all their sides opaque except respectively the sides 38 and 39 forming the surface facing the camera assembly which is translucent. Attached to the side 38 is a large sheet of opaque material 41 and attached to the side 39 are four small sheets of opaque material 42. Each box-shaped structure 36 and 37 contains a flash tube 43, 44. The sheets of opaque material 41, 42 are respectively dimensioned so that they will cover the part or parts of the sensitised sheet upon which an image or images are to be exposed, while the part of the plate which remains translucent will be such as to provide a border around a finished image or images. This system for producing a border around the image is advantageous because where a reversal process is used, any parts of the sheet of photo-sensitive material not exposed appear black in the finished photograph, and thus by exposing the border around the image or images a white border is obtained.

FIG. 5 also illustrates by means of arrows the movement paths of the cameras and border producing system. The arrows A indicate the initial direction of movement of the cameras 10 and 11 and the arrows B the initial direction of movement of the border producing system as the cameras and border producing system are traversed from the position shown where the camera 10 is in register with the slot 21 to the position in which the camera 11 is in register therewith. Thus it will be seen that the initial movements of the camera and border producing system relative to the plate 20 are generally parallel with the axes of the cameras. Arrows C and D indicate the terminal movements of the cameras and the border producing system relative to the plate 20 and again it will be seen that these movements also take place in a direction generally parallel to the axes of the cameras. The intermediate movements of the camera and border producing system relative to the plate 20 will be arcuate, and will be, at the top of the arc, perpendicular to the axes of the cameras.

The apparatus is shown in FIG. 5 in the position it will occupy when one large image is to be exposed on the sheet of sensitised paper. The position of the apparatus in FIGS. 2, 3 and 4 is that which it will occupy in an intermediate position, when traversing between the position shown in FIG. 5 and the position it occupies when four small images are to be exposed on the sheet of sensitised material.

In operation the user inserts a coin and then selects whether one large image is to be taken, or four small simultaneous images, or four small successive images are to be taken. Assuming that the camera assembly is in position for four small images to be taken and the user selects the one large image, the motor driving the crank 35 will be put in operation to rotate the crank 35 in the direction of the arrow A' as shown in FIG. 3, which will move the camera assembly and backing member about the pivot pins 30, 31 from the position in which the camera 11 and the masks 42 of the backing member are in register with the slot 21 to a position in which the camera 10 and the mask 41 of the backing member are in register with the slot. When this position is reached and as shown in FIG. 5, the crank 35 rotates unidirectionally so that when the camera 10 is positioned in register with the slot 21 the crank 35 and the arms 32 and 34 will be in the position shown and when the positions are to be changed continued rotation of the crank in the same direction through another 180° will move the parts back to their initial position. When the motor driving the crank 35 is stopped the apparatus is ready to expose an image on the sheet of photo-sensitive material in the slot 21 and then either after a timed interval or upon operation of a control by the subject the flash apparatus 43 is operated so as to expose the edges of the sheet of sensitised material to produce a white border, and the shutter mechanism of the camera is then operated to expose a large image on the sheet of photo-sensitive material. After exposure the sheet of sensitised material is then fed downwardly into the treatment apparatus. The sheet is fed from a reel in the magazine 2 and after the length of photo-sensitive sheet material corresponding to the exposure and required border has been fed out from the slot a guillotine 45 is operated to cut the photo-sensitive sheet material. The material then passes through the treatment apparatus and is delivered to the subject through the slot 8.

Suitable strips of felt or the like may be included at 46 and 47 to ensure that when the cameras are in their operative positions no light can enter the apparatus.

The present apparatus thus provides a simple arrangement in which the cameras can be transferred from one position to another with only a few moving parts, but also the initial and terminal movement of the cameras relative to the plate 22 and slot 21 are generally parallel with the axes of the cameras, so that the sheet of photo-sensitive material is not subject to the scratching which takes place in an arrangement where the cameras traverse across the sheet.

What I claim as my invention and desire to secure by Letters Patent is:

1. Photographic apparatus including a single support means arranged to locate and support a sheet of photo-sensitive material in an exposure position, two cameras adjacent to one another and guide means for moving the cameras and support means relative to one another between positions in which the support means is behind one or the other of the cameras, the guide means being constructed so that the initial and terminal relative movements between the cameras and the support means are generally parallel with the axes of the cameras.

2. Apparatus as claimed in claim 1 in which the support means is arranged to be stationary and the cameras are arranged to move.

3. Apparatus as claimed in claim 1 in which the cameras are coupled to the support by a linkage producing the required movement.

4. Apparatus as claimed in claim 3 in which the linkage is afforded by parallel links.

5. Apparatus as claimed in claim 1 in which one camera is arranged to produce a single large image of a subject occupying substantially the whole area of a sheet of sensitised material and the other camera is arranged to produce four small images each occupying approximately one quarter of the area of a sheet of sensitised material.

6. Apparatus as claimed in claim 5 in which there is on the side of the support means remote from the cameras a border producing system for borders on the finished photograph and having two sections, one for producing a border around the single image produced by one camera and the other for producing borders around the several images produced by the other camera and there is second guide means for moving the said system and support means relative to one another between the positions in which the support means is in front of one section or the other of the said system, the second guide means being constructed so that the initial and terminal relative movements between the said system and the support means are generally parallel with the axes of the camera.

7. Apparatus as claimed in claim 6 in which the first and second guide means are afforded by the same parallel links centrally pivoted on or adjacent the support with the cameras pivoted to one end of the links and the said system pivoted to the other.

8. Apparatus as claimed in claim 6 in which the border producing system includes an opaque mask or masks arranged to closely abut the area or areas of sheet to be exposed and means for exposing the remaining area of the sheet to light for an appropriate period so that the sheet, when delivered from the treatment apparatus, will have a white border around the image or images.

References Cited

UNITED STATES PATENTS

| | | | |
|---|---|---|---|
| 2,655,084 | 10/1953 | Roehrig | 95—31 PF |
| 3,230,849 | 1/1966 | Clark | 95—18 X |

SAMUEL S. MATTHEWS, Primary Examiner

M. L. GELLNER, Assistant Examiner

U.S. Cl. X.R.

95—14, 18, 36; 355—46